United States Patent
Yun

(10) Patent No.: US 9,116,564 B2
(45) Date of Patent: Aug. 25, 2015

(54) TOUCH SCREEN PANEL AND DISPLAY DEVICE WITH THE SAME

(71) Applicant: Samsung Display Co., Ltd., Yongin, Gyeonggi-Do (KR)

(72) Inventor: Yeo-Jin Yun, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 79 days.

(21) Appl. No.: 13/929,159

(22) Filed: Jun. 27, 2013

(65) Prior Publication Data

US 2014/0022191 A1  Jan. 23, 2014

(30) Foreign Application Priority Data

Jul. 17, 2012  (KR) .................. 10-2012-0077786

(51) Int. Cl.
G06F 3/044 (2006.01)
G06F 3/041 (2006.01)

(52) U.S. Cl.
CPC ............... *G06F 3/041* (2013.01); *G06F 3/044* (2013.01); *G06F 2203/04107* (2013.01)

(58) Field of Classification Search
CPC ................. G06F 3/044; G06F 2203/04107
USPC ................. 178/18.01–19.07; 345/173–178
See application file for complete search history.

(56) References Cited

U.S. PATENT DOCUMENTS

| | | | | |
|---|---|---|---|---|
| 2001/0043291 A1* | 11/2001 | Kono et al. | .................. | 349/12 |
| 2009/0079894 A1* | 3/2009 | Okuda | .................. | 349/58 |
| 2009/0256471 A1 | 10/2009 | Kim et al. | | |
| 2010/0007616 A1* | 1/2010 | Jang | .................. | 345/173 |
| 2010/0220071 A1* | 9/2010 | Nishihara et al. | .................. | 345/173 |
| 2011/0050625 A1 | 3/2011 | Kim et al. | | |
| 2011/0216018 A1 | 9/2011 | Kim et al. | | |
| 2011/0227838 A1 | 9/2011 | Jeon et al. | | |
| 2011/0242021 A1 | 10/2011 | Jun et al. | | |
| 2011/0248938 A1 | 10/2011 | Kwak et al. | | |
| 2012/0044178 A1 | 2/2012 | Song | | |

(Continued)

FOREIGN PATENT DOCUMENTS

| | | | |
|---|---|---|---|
| KR | 1020070017821 A | 2/2007 |
| KR | 100830331 B1 | 5/2008 |

(Continued)

*Primary Examiner* — Michael Pervan
(74) *Attorney, Agent, or Firm* — Robert E. Bushnell, Esq.

(57) ABSTRACT

A touch screen panel, which may be included in a display device, is capable of removing influence due to static electricity applied from the outside by forming a guard ring pattern at an edge of one surface of a window substrate and by implementing a connection part electrically connected to the guard ring pattern so as to directly contact a bezel supporting the touch screen panel. The touch screen panel includes: a transparent substrate divided into an active area and a non-active area positioned at an outside portion of the active area; sensing patterns formed in the active area of a first surface of the transparent substrate; sensing lines formed in the non-active area of the first surface of the transparent substrate and connected to the sensing patterns; and a window substrate provided with a guard ring pattern attached to a second surface of the transparent substrate and formed at an edge of a surface thereof attached to the transparent substrate, and at least one connection part extended from one side of the guard ring pattern.

15 Claims, 2 Drawing Sheets

(56) References Cited

U.S. PATENT DOCUMENTS

| | | |
|---|---|---|
| 2012/0062487 A1 | 3/2012 | Lee et al. |
| 2012/0075257 A1 | 3/2012 | Choi et al. |
| 2012/0098762 A1 | 4/2012 | Kim et al. |
| 2012/0105343 A1 | 5/2012 | Lee et al. |
| 2012/0154725 A1 | 6/2012 | Jeon et al. |

FOREIGN PATENT DOCUMENTS

| | | |
|---|---|---|
| KR | 1020080102446 A | 11/2008 |
| KR | 100932981 B1 | 12/2009 |

\* cited by examiner

TOUCH SCREEN PANEL AND DISPLAY DEVICE WITH THE SAME

CLAIM OF PRIORITY

This application makes reference to, incorporates the same herein, and claims all benefits accruing under 35 U.S.C. §119 from an application earlier filed in the Korean Intellectual Property Office on the 17 of Jul. 2012 and there duly assigned Serial No. 10-2012-0077786.

BACKGROUND OF THE INVENTION

1. Field of the Invention

The present invention relates to a touch screen panel, and more particularly, to a touch screen panel capable of minimizing an influence due to static electricity applied from the outside, and a display device with the same.

2. Description of the Related Art

A touch screen panel is an input device capable of inputting a user's instruction by selecting instruction contents displayed on a screen of an image display device, or the like, with a human hand or an object.

To this end, the touch screen panel is provided on a front surface of the image display device to convert a contact position directly contacted by the human hand or the object into an electric signal. Therefore, the instruction contents selected at the contact position are recognized as an input signal.

Since the touch screen panel may be substituted for a separate input device operated by being connected to the image display device, such as a keyboard or a mouse, application fields thereof have been gradually extended.

As a means for implementing the touch screen panel, a resistive type touch screen panel, a photosensitive type touch screen panel, a capacitive type touch screen panel, and the like, have been known. Among them, the capacitive type touch screen panel senses a change in capacitance formed between a conductive sensing pattern and other adjacent sensing patterns or a ground electrode, or the like, when a human hand or an object contacts the touch screen panel, thereby converting the contact position into an electric signal.

Generally, the touch screen panel is separately manufactured and is then attached to an outer surface of a display panel of an image display device such as a liquid display device or an organic light emitting display device. The touch screen panel further includes a window substrate provided on an upper surface thereof in order to improve strength of the device.

The touch screen panel having the structure according to the related art as described above may malfunction, or an inner circuit of the touch screen panel may be damaged, due to static electricity generated when it is being manufactured, transported, used, or the like. Particularly, it is likely that external static electricity will be introduced into the panel through the window substrate provided at the outermost side of the touch screen panel.

SUMMARY OF THE INVENTION

An object of the present invention is to provide a touch screen panel capable of removing an influence due to static electricity applied from the outside by forming a guard ring pattern at an edge of one surface of a window substrate and implementing a connection part electrically connected to the guard ring pattern so as to directly contact a bezel supporting the touch screen panel, and a display device having such a touch screen panel.

A touch screen panel may include: a transparent substrate divided into an active area and a non-active area positioned at an outside portion of the active area; sensing patterns formed in the active area of a first surface of the transparent substrate; sensing lines formed in the non-active area of the first surface of the transparent substrate and connected to the sensing patterns; and a window substrate provided with a guard ring pattern attached to a second surface of the transparent substrate and formed at an edge of a surface thereof attached to the transparent substrate, and at least one connection part extending from one side of the guard ring pattern.

The connection part may be extended to a side of the window substrate so as to directly connect a bezel made of conductive material.

The guard ring pattern and the connection part may be positioned at an outer side of the active area and are made of an opaque metal material having low resistance characteristics.

The transparent substrate may be formed of a polarization film including a polarizer, a phase difference compensating layer, and a transparent adhesive supporting the polarizer and attaching the phase difference compensating layer to the polarizer.

The window substrate may be made of at least one of polymethyl methacrylate (PMMA), acryl, and polyester (PET).

The sensing patterns may include: first sensing cells connected to each other in a first direction; first connection lines connecting the adjacent first sensing cells to each other; second sensing cells connected to each other in a second direction; and second connection lines connecting the adjacent second sensing cells to each other.

The first connection lines and the second connection lines may include an insulating layer interposed therebetween at an intersection part thereof.

The touch screen panel may further include a black matrix formed in the non-active area of the first surface of the transparent substrate.

A display device with a touch screen panel may include: a transparent substrate divided into an active area and a non-active area positioned at an outside portion of the active area; sensing patterns formed in the active area of a first surface of the transparent substrate; sensing lines formed in the non-active area of the first surface of the transparent substrate and connected to the sensing patterns; a window substrate attached to a second surface of the transparent substrate; a display device attached to the first surface of the transparent substrate so as to face the sensing patterns and the sensing lines; and a bezel having a form in which it encloses the transparent substrate, the window substrate, and the display device at a side of them so as to support them and made of a conductive material; wherein the window substrate includes a guard ring pattern formed at an edge of a first surface thereof and at least one connection part extending from one side of the guard ring pattern, the connection part directly contacting a bezel made of conductive material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
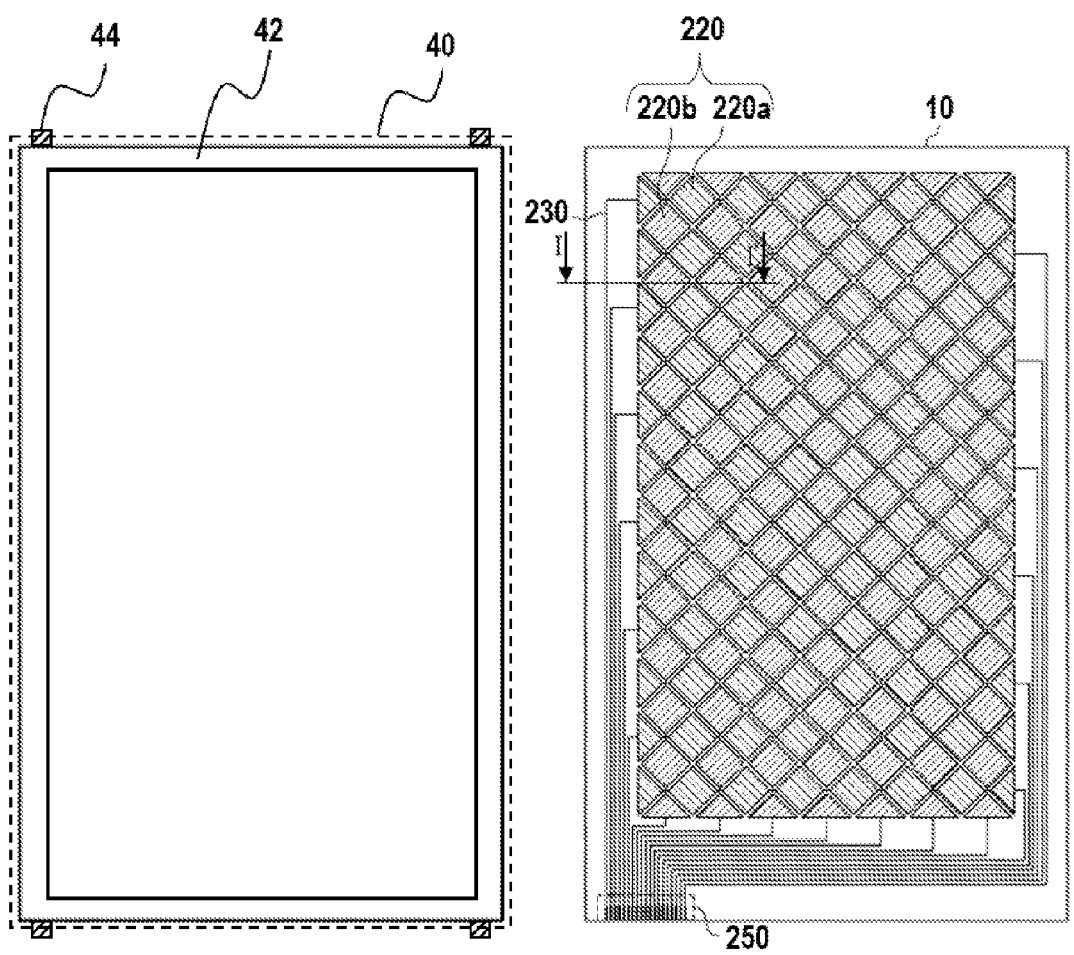
FIG. 1 is a planar view schematically showing a touch screen panel according to an one embodimentone embodiment of the present invention.

In the following detailed description, only certain one embodiment of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. In the description below, like reference numerals refer to like elements.

Hereinafter, one embodiment of the present invention will be described in detail with reference to the accompanying drawings.

Figure 2:
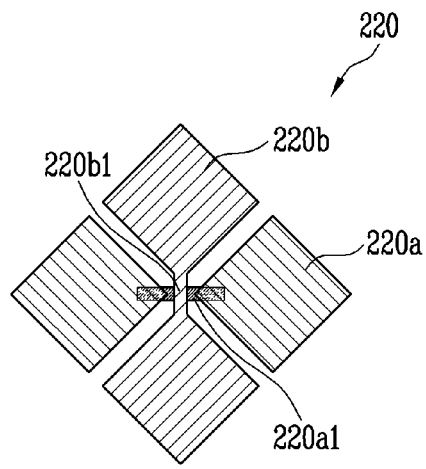
FIG. 2 is an enlarged view of main parts of a sensing pattern of the touch screen shown in FIG. 1.

FIG. 1 is a planar view schematically showing a touch screen panel according to an one embodiment of the present invention; FIG. 2 is an enlarged view of main parts of a sensing pattern of the touch screen panel shown in FIG. 1; and FIG. 3 is a cross-sectional view taken along the line I-I' of the touch screen panel of FIG. 1 and a display device having the touch screen panel according to the one embodiment of the present invention.

Figure 3:
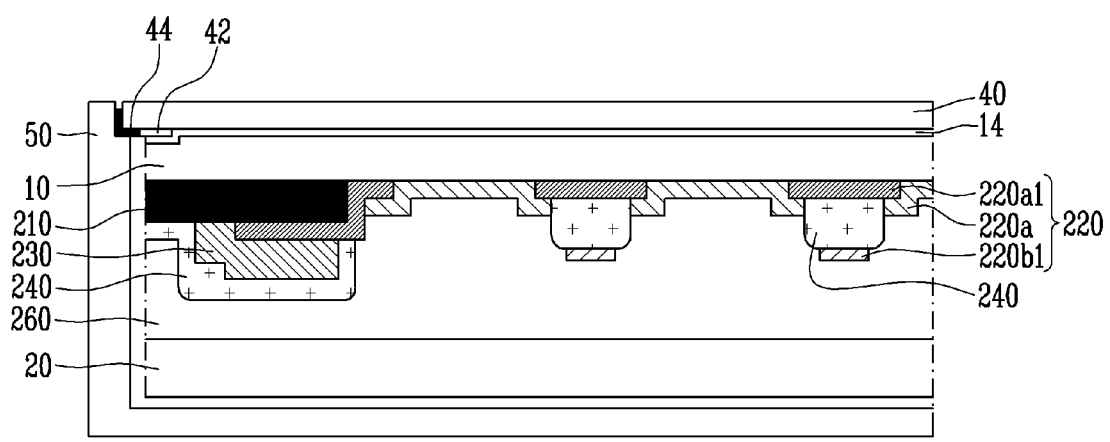
FIG. 3 is a cross-sectional view taken along the line I-I' of the touch screen panel of FIG.1 and a display device having the touch screen panel according to the one embodimentone embodiment of the present invention.

Referring to FIGS. 1 to 3, the touch screen panel according to the one embodiment of the present invention includes a transparent substrate 10, sensing patterns 220 formed on a first surface of the transparent substrate 10, and sensing lines 230 connecting the sensing patterns 220 to an external driving circuit (not shown) through a pad part 250.

The transparent substrate 10 is generally made of glass. However, the transparent substrate 10 may also be formed of a polyimide (PI) film or a polarization film which is a material having flexible characteristics.

Particularly, in the case in which the transparent substrate 10 is formed of the polarization film, the transparent substrate 10 may be implemented in a structure in which a polarizer, a transparent adhesive layer, and a phase difference compensating layer are stacked by removing a support layer included in an existing polarization plate and made of a TAC material. Therefore, the transparent substrate 10 may have the flexible characteristics, that is, high bending characteristics.

An existing polarization plate is implemented in a structure in which a polarizer is interposed between upper and lower support layers.

The polarizer, which serves to control an amount of light transmitted according to a polarization degree of incident light, may be formed of a film made of a polyvinylalcohol (PVA) material. As an example, the polarizer implements polarization by stretching the PVA film absorbing iodine by means of strong tension.

Furthermore, the support layers provided at upper and lower portions of the polarizer may be formed of a film made of a triacetyl cellulose (TAC) material for protecting and supporting the PVA film.

The polarization plate, as described above, is generally attached to an outer side of a panel of an image display device in order to improve outdoor visibility such as blocking, or the like, of external light reflection. In the case in which the touch screen panel is attached to an upper portion of the panel of the image display device, the polarization plate may be attached to an outer surface of the touch screen panel.

However, the polarization plate and the touch screen panel are separately manufactured and are then attached or assembled to each other. In this case, process efficiency, yield, or the like may decrease.

Particularly, the polarization plate having the stacked structure as described above has an entire thickness of about 180 μm since the polarizer has a thickness of about 20 μm and the upper and lower support layers have thicknesses of about 80 μm, respectively. Therefore, in the case in which the polarization plate is attached to the touch screen panel as it is, the entire thickness of the touch screen panel increases, which is not in accordance with the trend toward thinness of the touch screen panel.

Also, since the TAC, which is a material of the support layer, has high elasticity, when the polarization plate including the support layer is attached to the flexible touch screen panel, the bending characteristic of the flexible touch screen panel may not be obtained.

Therefore, according to the one embodiment of the present invention, in the case in which the transparent substrate 10 on which the sensing patterns 220 are formed is formed of a polarization film, in order to overcome these disadvantages, the support layer included in the existing polarization plate is removed, and the polarizer is supported and protected by the transparent adhesive layer, thereby making it possible to allow the transparent substrate 10 to have the flexible characteristics.

Furthermore, in the touch screen panel according to the one embodiment of the present invention, the transparent substrate 10 includes the sensing patterns 220 and the sensing lines 230 formed on the first surface thereof and a window substrate 40 attached to the second surface thereof by a transparent adhesion 14 (see FIG. 3).

The window substrate 40 is generally made of tempered glass. However, the window substrate 40 may also be made of a material having flexible characteristics in the case in which the display device and the touch screen panel have flexible characteristics.

The window substrate 40 is provided at an outermost side of the display device. Therefore, it is likely that external static electricity, generated when a product is manufactured, transported, or used, will be introduced into the touch screen panel through the window substrate 40.

Therefore, according to the one embodiment of the present invention, in order to solve this problem, as shown in FIGS. 1 and 3, a guard ring pattern 42 is formed at an edge of the first surface of the window substrate 40, and a connection part 44 electrically connected to the guard ring pattern 42 is implemented so as to directly contact a bezel 50 supporting the touch screen panel and made of a conductive material, thereby making it possible to remove influence due to the static electricity applied from the outside.

That is, since the guard ring pattern 42, formed at an inner side of the window substrate 40, is electrically connected to the bezel 50 made of a conductive material through the connection part 44, when external static electricity is introduced into the window substrate 40, the external static electricity primarily flows to the bezel 50 formed of a conductive material, which is a ground power source, through the guard ring pattern 42. Therefore, it is possible to prevent the introduction of the external electrostatic characteristics into the touch screen panel.

In this case, the connection part 44 may be extended from one side of the guard ring pattern 42 and the number of connection parts may be at least one. As shown in FIG. 3, the connection part 44 is extended to the side of the window substrate 40 so that contact between the connection part 44 and the conductive bezel 50 may be more easily implemented.

Also, the guard ring pattern 42 and the connection part 44 may be formed by a photolithography process, a printing process, a plating process, or the like. Furthermore, since the guard ring pattern 42 and the connection part 44 are positioned at an outer side of an active area of the touch screen panel and thus are not viewed by users, the guard ring pattern 42 and the connection part 44 may be made of an opaque metal material having low resistance characteristics.

A configuration of the touch screen panel according to the one embodiment of the present invention will now be described.

First, as shown in FIG. 2, the sensing patterns 220 includes a plurality of first sensing cells 220a formed so as to be connected to each other in a column direction for each column line, first connecting lines 220a1 connecting the first sensing cells 220a to each other in the column direction, second sensing cells 220b formed so as to be connected to each other in a row direction for each row line, and second connecting lines 220b1 connecting the second sensing cells 220b to each other in the row direction.

For convenience, although only some of the sensing patterns are shown in FIG. 2, the touch screen panel has a structure in which the sensing patterns shown in FIG. 2 are repeatedly disposed.

The first and second sensing cells 220a and 220b, respectively, are alternatively disposed so as not to be overlapped with each other, and the first and second connecting lines 220a1 and 220b1, respectively, intersect with each other. Here, an insulating layer (not shown) is interposed between the first and second connecting lines 220a1 and 220b1, respectively, in order to secure stability.

Meanwhile, the first and second sensing cells 220a and 220b, respectively, may be formed integrally with the first and second connecting lines 220a1 and 220b1, respectively, using a transparent conductive material such as indium tin oxide (ITO), or they may be formed separately from the first and second connecting lines 220a1 and 220b1, respectively, and then electrically connected to the first and second connecting lines 220a1 and 220b1, respectively.

For example, the second sensing cells 220b may be patterned integrally with the second connection lines 220b1 in the row direction, and the first sensing cells 220a may be patterned between the second sensing cells 220b so that each has an independent pattern and they are connected to each other by the first connecting lines 220a1 positioned at an upper or lower portion thereof in the column direction.

Here, the first connecting lines 220a1 may directly contact the first sensing cells 220a on an upper or lower portion of the first sensing cells 220a, thereby being electrically connected thereto, or they may be electrically connected to the first sensing cells 220a through contact holes, or the like.

The first connecting lines 220a1 may be made of a transparent conductive material such as ITO or they may be made of an opaque low resistance metal material, and have an adjusted width, or the like, in order to prevent visualization of the pattern.

In addition, the sensing lines 230 shown in FIG. 1 are connected to the first sensing cells 220a in a column unit and the second sensing cells 220b in a row unit so as to connect the first and second cells 220a and 220b, respectively, to an external driving circuit (not shown), such as a position detecting circuit, through the pad unit 250.

These sensing lines 230, which are disposed in the non-active area corresponding to an outside portion of the active area in which an image is displayed, may be made of a wide range of materials. That is, the sensing lines 230 may be made of a low resistance metal material such as molybdenum (Mo), silver (Ag), titanium (Ti), copper (Cu), aluminum (Al), molybdenum/aluminum/molybdenum (Mo/Al/Mo), and the like, in addition to the transparent conductive material used to form the sensing patterns 220.

The touch screen panel according to the one embodiment of the present invention, as described above, is a capacitive type touch panel. When a contact object, such as a human hand, a stylus pen, or the like, contacts the touch screen panel, a change in capacitance according to the contact position is transferred from the sensing patterns 220 to the driving circuit (not shown) via the sensing lines 230 and the pad unit 250. In this case, the change in capacitance is converted into an electrical signal by X and Y input processing circuits, or the like (not shown), such that the contact position is recognized.

FIG. 3 is a partially cross-sectional view of a non active area and an active area of the touch screen panel formed on the first surface of the transparent substrate 10 of FIG. 1, and cross-sectional view of a display device including the touch screen panel according to the one embodiment of the present invention is shown in FIG. 3.

FIG. 3 shows a structure in which the display device 20 is attached to the first surface of the transparent substrate 10 by the transparent adhesive layer 260.

In the case in which the transparent substrate 10 has the flexible characteristics as described above, the display device 20 may also be implemented as a display device having the flexible characteristics, for example, an organic light emitting display device.

Since the organic light emitting display device, which is a self light emitting device, does not need to have a backlight unit as required in existing liquid display devices, the substrate is made of ploymethylmethacrylate (PMMA), acryl, polyester PET, or the like, so that the organic light emitting display device may have the flexible characteristics.

Here, the transparent adhesive layer 260 may be formed of a super view resin (SVR), an optical cleared adhesive (OCA), or the like, which is a transparent adhesive material having high light transmissivity.

Referring to FIG. 2 and FIG. 3, the sensing patterns 220 formed on the active area of the transparent substrate 10 include: the first sensing cells 220a formed so as to be connected to each other in the column direction for each column line; the first connecting lines 220a1 connecting the first sensing cells 220a to each other in the column direction; the second sensing cells 220b formed so as to be connected to each other in the row direction for each row line; and the second connecting lines 220b1 connecting the second sensing cells 220b to each other in the row direction; wherein the firs connecting lines 220a1 and the second connection lines 220b1 have the insulating layer 240 therebetween at an intersection part thereof.

However, although thicknesses of the components, such as the sensing patterns 220, and the like, configuring the touch screen panels, are exaggerated in FIG. 3 for convenience of explanation, actual thicknesses of the respective components are much thinner than the shown thicknesses.

Also, a black matrix 210 and the sensing lines 230, overlapped with the black matrix 210 and electrically connected to the sensing patterns 220, are formed in the non-active area positioned at the outer side of the active area, as shown in FIG. 3.

Here, the black matrix 210 serves to prevent the patterns, such as the sensing lines formed in the non-active area, from being visualized, and forms an edge of the display area.

In addition, as described above, in the case in which the transparent substrate 10 is formed of the polarization film having the flexible characteristics and the display device is the flexible organic light emitting display device, with the structure according to the one embodiment of the present invention, the touch screen panel is positioned between the display device 20 and the transparent substrate 10 formed of polarization film, thereby making it possible to prevent the sensing pattern from being visualized and to minimize reflectivity while maintaining the flexible characteristics.

Furthermore, the window substrate 40 may be additionally attached to the upper surface of the transparent substrate 10 (that is, the second surface of the transparent substrate 10 on which the sensing patterns 220 are not formed) by the transparent adhesive 14 in order to improve the strength of the device.

However, as described above, since the display device 20 and the touch screen panel have the flexible characteristics, the window substrate 40 may also be made of a material having the flexible characteristics.

Therefore, according to the one embodiment of the present invention, the window substrate 40 may be made of a material, such as polymethylmethacrylate (PMMA), acryl, polyester (PET), or the like, and have a thickness of about 0.7 mm In addition, the guard ring pattern 42 is formed at the edge of the lower surface, that is, the first surface, of the window substrate 40, and the connection part 44 electrically connected to the guard ring pattern 42 is implemented so as to directly contact the bezel 50 supporting the touch screen panel and is made of the conductive material, thereby making it possible to remove the influence due to static electricity applied from the outside.

The bezel 50 (FIG. 3) made of conductive material has a form in which it encloses the transparent substrate 10, the window substrate 40, and the display device 20 at a side and a lower portion of them so as to support them.

Here, the window substrate 40 has an area wider than that of the transparent substrate 10, and the connection part 44 is positioned at a distal end portion of the window substrate 40 which is not overlapped with the transparent substrate 10.

That is, the connection part 44 may be extended from one side of the guard ring pattern 42, and the number of connection parts may be at least one. As shown in FIG. 3, the connection part 44 is extended to the distal end of the side of the window substrate 40 so that contact between the connection part 44 and the conductive bezel 50 may be more easily implemented.

Furthermore, since the guard ring pattern 42 and the connection part 44 are positioned at an outer side of the active area of the touch screen panel, that is, an area corresponding to the non-active area, as shown in FIG. 3, and thus are not viewed by the users, the guard ring pattern 42 and the connection part 44 may be made of an opaque metal material having low resistance characteristics.

As described above, since the guard ring pattern 42 formed at the inner side of the window substrate 40 is electrically connected, through the connection part 44, to the bezel 50 made of conductive material, when external static electricity is introduced into the window substrate 40, the external static electricity primarily flows through the guard ring pattern 42 to the bezel 50 formed of the conductive material, which is the ground power source. Therefore, it is possible to prevent the introduction of the external electrostatic characteristics into the touch screen panel.

As set forth above, according to the one embodiment of the present invention, the guard ring pattern is formed at the edge of one surface of the window substrate, and the connection part, electrically connected to the guard ring pattern directly, is implemented so as to directly contact the bezel supporting the touch screen panel, thereby making it possible to remove adverse influence due to static electricity applied from the outside.

While the present invention has been described in connection with certain one embodiment, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
a transparent substrate divided into an active area and a non-active area positioned at an outside portion of the active area;
sensing patterns formed in the active area of a first surface of the transparent substrate;
sensing lines formed in the non-active area of the first surface of the transparent substrate, and connected to the sensing patterns; and
a window substrate provided with a guard closed-ring pattern attached to a second surface of the transparent substrate opposite to the first surface, and formed to enclose an entirety of at an edge of a surface of the window substrate attached to the transparent substrate, and at least one connection part extending from one side of the guard closed-ring pattern.

2. The touch screen panel according to claim 1, wherein said at least one connection part directly contacts a bezel supporting the touch screen panel and made of a conductive material.

3. The touch screen panel according to claim 2, wherein said at least one connection part is extended to a side of the window substrate so as to directly contact the bezel made of the conductive material.

4. The touch screen panel according to claim 1, wherein the guard closed-ring pattern and said at least one connection part are positioned at an outer side of the active area, and are made of an opaque metal material having low resistance characteristics.

5. The touch screen panel according to claim 1, wherein the transparent substrate is formed of a polarization film including a polarizer, a phase difference compensating layer, and a transparent adhesive supporting the polarizer and attaching the phase difference compensating layer to the polarizer.

6. The touch screen panel according to claim 1, wherein the window substrate is made of at least one of polymethyl methacrylate (PMMA), acryl, and polyester (PET).

7. The touch screen panel according to claim 1, wherein the sensing patterns include:
first sensing cells connected to each other in a first direction;
first connection lines connecting adjacent first sensing cells to each other;

second sensing cells connected to each other in a second direction;

second connection lines connecting adjacent second sensing cells to each other.

8. The touch screen panel according to claim 7, wherein the first connection lines and the second connection lines include an insulating layer interposed therebetween at an intersection part thereof.

9. The touch screen panel according to claim 1, further comprising a black matrix formed in the non-active area of the first surface of the transparent substrate.

10. A display device having a touch screen panel, comprising:
- a transparent substrate divided into an active area having sensing patterns responsive to manual touch and a non-active area positioned at an outside portion of the active area;
- the sensing patterns formed in the active area of a first surface of the transparent substrate;
- sensing lines formed in the non-active area of the first surface of the transparent substrate, and connected to the sensing patterns;
- a window substrate attached to a second surface of the transparent substrate;
- a display device attached to the first surface of the transparent substrate so as to face the sensing patterns and the sensing lines; and
- a bezel having a form in which it encloses the transparent substrate, the window substrate and the display device at a side of the bezel so as to support the transparent substrate, the window substrate and the display device, and the bezel is made of a conductive material;
- wherein the window substrate includes a guard closed-ring pattern formed at an edge of a first surface of the window substrate and at least one connection part extending from one side of the guard closed-ring pattern, said at least one connection part directly contacting the bezel made of the conductive material.

11. The display device according to claim 10, wherein said at least one connection part is extended to a side of the window substrate and directly contacts the bezel made of the conductive material.

12. The display device according to claim 10, wherein the guard closed-ring pattern and said at least one connection part are positioned at an outer side of the active area and are made of an opaque metal material having low resistance characteristics.

13. A touch screen panel, comprising:
- a transparent substrate divided into an active area having sensing patterns that are formed in the active area of a first surface of the transparent substrate and that are operationally responsive to manual touch by a user of the panel and a non-active area positioned at an outside portion of the active area;
- sensing lines formed in the non-active area of the first surface of the transparent substrate, and connected to the sensing patterns; and
- a window substrate provided with a guard ring pattern attached to a second surface of the transparent substrate opposite to the first surface, and formed to enclose an entirety of an edge of a surface of the window substrate attached to the transparent substrate, and at least one connection part extending from one side of the guard ring pattern.

14. The touch screen panel according to claim 13, wherein said at least one connection part directly contacts a bezel supporting the touch screen panel and made of a conductive material.

15. The touch screen panel according to claim 14, wherein said at least one connection part is extended to a side of the window substrate so as to directly contact the bezel made of the conductive material.

* * * * *